United States Patent
Dezonno (10) Patent No.: US 7,813,489 B2
(45) Date of Patent: Oct. 12, 2010

(54) SYSTEM AND METHOD FOR MINIMIZING QUEUE CALLBACK FAULTS

(75) Inventor: Anthony J. Dezonno, Bloomingdale, IL (US)

(73) Assignee: Aspect Software, Inc., Lombard, IL (US)

( * ) Notice: Subject to any disclaimer, the term of this patent is extended or adjusted under 35 U.S.C. 154(b) by 1244 days.

(21) Appl. No.: 10/883,153

(22) Filed: Jun. 30, 2004

(65) Prior Publication Data

US 2006/0002538 A1    Jan. 5, 2006

(51) Int. Cl.
H04M 3/42    (2006.01)

(52) U.S. Cl. .................. 379/210.01; 370/351; 370/352; 370/353; 370/354; 370/355; 379/88.04; 379/88.13; 379/88.17; 379/88.18; 379/201.01; 379/207.03; 379/212.01; 379/218.02; 379/265.01; 379/265.02; 379/265.11; 379/266.07; 705/8; 705/9; 709/202; 709/203; 709/227; 709/228; 709/229

(58) Field of Classification Search ............ 379/210.01, 379/88.04, 88.13, 88.17, 88.18, 201.01, 207.03, 379/212.01, 218.02, 265.01–265.02, 265.11, 379/266.07, 309–310; 370/351–356; 455/414.1; 705/8–9; 709/201–203, 227–229

See application file for complete search history.

(56) References Cited

U.S. PATENT DOCUMENTS

| | | | |
|---|---|---|---|
| 4,809,272 A | 2/1989 | Torgrim et al. ........... 370/110.3 |
| 4,881,261 A | 11/1989 | Oliphant et al. ............. 379/215 |
| 5,181,236 A | 1/1993 | LaVallee et al. ............... 379/67 |
| 5,185,782 A * | 2/1993 | Srinivasan ............. 379/210.01 |
| 5,309,513 A | 5/1994 | Rose ......................... 379/265 |
| 5,311,574 A * | 5/1994 | Livanos ................. 379/209.01 |
| 5,335,269 A | 8/1994 | Steinlicht ..................... 379/266 |
| 5,384,841 A | 1/1995 | Adams et al. ................ 379/266 |
| 5,479,487 A * | 12/1995 | Hammond ............... 379/88.22 |
| 5,546,456 A | 8/1996 | Vilsoet et al. ................ 379/265 |
| 5,555,179 A | 9/1996 | Koyama et al. |
| 5,627,884 A | 5/1997 | Williams et al. .............. 379/88 |
| 5,765,033 A | 6/1998 | Miloslavsky |
| 5,926,539 A | 7/1999 | Shtivelman |
| 5,946,387 A | 8/1999 | Miloslavsky |
| 5,953,332 A | 9/1999 | Miloslavsky |
| 5,953,405 A | 9/1999 | Miloslavsky |
| 5,991,394 A | 11/1999 | Dezonno et al. ............ 379/265 |
| 6,002,760 A | 12/1999 | Gisby |
| 6,021,428 A | 2/2000 | Miloslavsky |
| 6,044,145 A | 3/2000 | Kelly et al. |
| 6,044,368 A | 3/2000 | Powers |
| 6,067,357 A | 5/2000 | Kishinsky et al. |
| 6,108,711 A | 8/2000 | Beck et al. |
| 6,138,139 A | 10/2000 | Beck et al. |
| 6,167,395 A | 12/2000 | Beck et al. |
| 6,170,011 B1 | 1/2001 | Beck et al. |
| 6,175,563 B1 | 1/2001 | Miloslavsky |
| 6,175,564 B1 | 1/2001 | Miloslavsky et al. |
| 6,185,292 B1 | 2/2001 | Miloslavsky |
| 6,295,354 B1 | 9/2001 | Dezonno ..................... 379/266 |
| 6,345,305 B1 | 2/2002 | Beck et al. |
| 6,373,836 B1 | 4/2002 | Deryugin et al. |

(Continued)

*Primary Examiner*—Hemant Patel
(74) *Attorney, Agent, or Firm*—Husch Blackwell Welsh & Katz (57) ABSTRACT

Queue callback systems and methods handle scheduled callbacks to requesters in the absence of resources by providing a pre-established message soliciting the establishment of an alternate callback. Non-callback options can also be presented to the respective requester. Agents can also be organized in a plurality of queues, each of a selected size, to more effectively use callback resources.

25 Claims, 5 Drawing Sheets

U.S. PATENT DOCUMENTS

| | | |
|---|---|---|
| 6,389,007 B1 | 5/2002 | Shenkman et al. |
| 6,393,015 B1 | 5/2002 | Shtivelman |
| 6,449,356 B1 | 9/2002 | Dezonno ............... 379/265.01 |
| 6,563,921 B1 | 5/2003 | Williams et al. ....... 379/266.01 |
| 6,621,899 B2 | 9/2003 | Dezonno et al. ....... 379/265.09 |
| 6,732,156 B2 | 5/2004 | Miloslavsky |
| 6,771,760 B1 * | 8/2004 | Vortman et al. ........ 379/209.01 |
| 6,879,683 B1 * | 4/2005 | Fain et al. .............. 379/265.02 |
| 7,127,059 B2 * | 10/2006 | Galvin ................... 379/265.03 |
| 2006/0256949 A1 * | 11/2006 | Noble, Jr. .............. 379/265.01 |

* cited by examiner

SYSTEM AND METHOD FOR MINIMIZING QUEUE CALLBACK FAULTS

FIELD OF THE INVENTION

The invention pertains to callback processing systems and methods. More particularly, the invention pertains to such systems and methods that minimize callback fault conditions in telephonic call distributor systems.

BACKGROUND OF THE INVENTION

Telephonic call distributor systems having message recording capability to receive and store messages from incoming calls where an agent is not promptly available are known. In such systems, the caller can be given an option to leave a message that might include a telephone number if that call cannot be responded to in a timely fashion. For example, LaVallee et al. U.S. Pat. No. 5,181,236 entitled "Automatic Call Returning Method for Call Distributor with Message Record Capability" issued Jan. 19, 1993, assigned to the assignee hereof, discloses systems and methods where voice messages left in queues can be automatically forwarded to one or more agents for callback when the respective agent becomes available. The '236 patent is hereby incorporated by reference herein. Such call distributions may be, but are not limited to, hardware and/or software systems with many possible configurations including distributed systems, integrated systems, systems based on one or more personal computers or servers and the like. This system may handle traditional telephone calls as well as other tips of "calls" or customer contacts including, but not limited to, facsimile, e-mail, Internet communications such as web chat, and VOIP (Voice Over Internet Protocol).

While useful and effective for its intended purpose, known systems such as LaVallee et al. do not address fault conditions where resources are unavailable for handling one or more scheduled callbacks. This can lead to both customer dissatisfaction as well as lost sales.

The issue of scheduled callbacks and the need to be able to respond thereto in a timely fashion is illustrated in Dezonno U.S. Pat. No. 6,449,356 B1 issued Sep. 10, 2002 entitled "Method of Multi-Media Transaction Processing," and, Dezonno et al. U.S. Pat. No. 6,621,899 B2 issued Sep. 16, 2003 entitled "Method and System for Establishing Voice Communications Using a Computer Network." Both Dezonno and Dezonno et al. are assigned to the assignee hereof and incorporated by reference. Both Dezonno and Dezonno et al. contemplate circumstances wherein customers or telephone users might enter requests for callbacks at specific days and times.

In Dezonno, customers may communicate with the disclosed call distributor system via the Internet or by email. Fields can be provided where the caller can enter a telephone number for a callback.

In Dezonno et al. the user can request a callback to a specific number at a designated time using a computer and a graphical user interface. The systems and methods of Dezonno and Dezonno et al. can be expected to result in an increase in requested callbacks at specific dates and/or times.

Customers' satisfaction in such circumstances is more likely than not to be achieved if the requested call back arrives at the designated day and time. Failures to place the requested callback at the specific day and time can occur where the respective call distributor system has more real time demands made on it than its resources are capable of responding to. For example, all agents may be busy and not available at the designated day and time that the callback is requested. Such circumstances can occur due to unexpected increases in incoming call volume, scheduling, availability of agents, or environmental problems such as weather.

There continues to be a need for systems and methods which will facilitate or provide callbacks notwithstanding the presence of a fault condition. It would be desirable if such enhanced capability could be cost effective incorporated into existing call distributor systems which provide for callbacks to customers.

SUMMARY OF THE INVENTION

A method in accordance with the invention minimizes call back faults, in one aspect, by receiving a plurality of callback requests, providing at least some of the callbacks using a human agent and providing a non-human response to others of the callbacks. The non-human response offers at least an opportunity to establish another callback. The method also includes storing received data for the another callback.

DETAILED DESCRIPTION OF THE EMBODIMENTS

While embodiments of this invention can take many different forms, specific embodiments thereof are shown in the drawings and will be described herein in detail with the understanding that the present disclosure is to be considered as an exemplification of the principles of the invention, and as a disclosure of the best mode of practicing the invention. It is not intended to limit the invention to the specific embodiment illustrated.

A system that embodies the invention incorporates a call distributor and control computer. The control computer maintains a queue of callbacks. The callbacks can be of the immediate nature or they can be scheduled for a specific day and time. Immediate callbacks are processed irrespective of the current day and time. Scheduled callbacks remain in the queue until the specified day and time at which to make the call.

When a callback is to be made, the system determines a resource, such as availability of an agent, to support the call. Where the resources are available, the call distributor is directed to place the designated call. Where the call is answered, the call distributor connects the agent to communicate with the called party. If the call is not answered the callback information can be updated for a follow up at a subsequent day and time and returned to the queue.

In the event that resources are unavailable to carry out the callback, the call distributor is directed to place the call. If the call is answered, a voice response unit is coupled to the subscriber to offer subsequent callback options or other options of interest. Bonuses or incentives can be offered to the subscriber as an inducement to accept a subsequent callback at a different time.

If the subscriber selects among the callback options, the callback data can be updated in the queue and the voice response unit can provide intervening as well as termination messages. In the event that the subscriber declines a callback option but selects among other available options such as hard copy mailing, fax communication or the like, information concerning the selected options can be obtained by either a voice recognition unit or DTMF tones generated by the subscriber using his or her telephone key pad. The voice responsive unit can provide an appropriate termination message subsequent to having received the information pertaining to the selected options.

In an alternate embodiment agents can be assigned to a plurality of queues for purposes of minimizing fault conditions. In the event that no agent is available from any of the designated queues, the above-described queue callback fault processing can be carried out to provide a callback at the scheduled day and time notwithstanding the availability of resources.

Thus, fault conditions and queue callbacks systems are addressed in accordance with the present invention by coupling the callback system with a voice response system. The callback system places an agent in communication with the requesting caller when those resources are available. Alternately, the voice response system is used to communicate with the subscriber if agent resources are not available.

While embodiments of this invention can take many different forms, specific embodiments thereof are shown in the drawings and will be described herein in detail with the understanding that the present disclosure is to be considered as an exemplification of the principles of the invention and is not intended to limit the invention to the specific embodiment illustrated.

Figure 1:
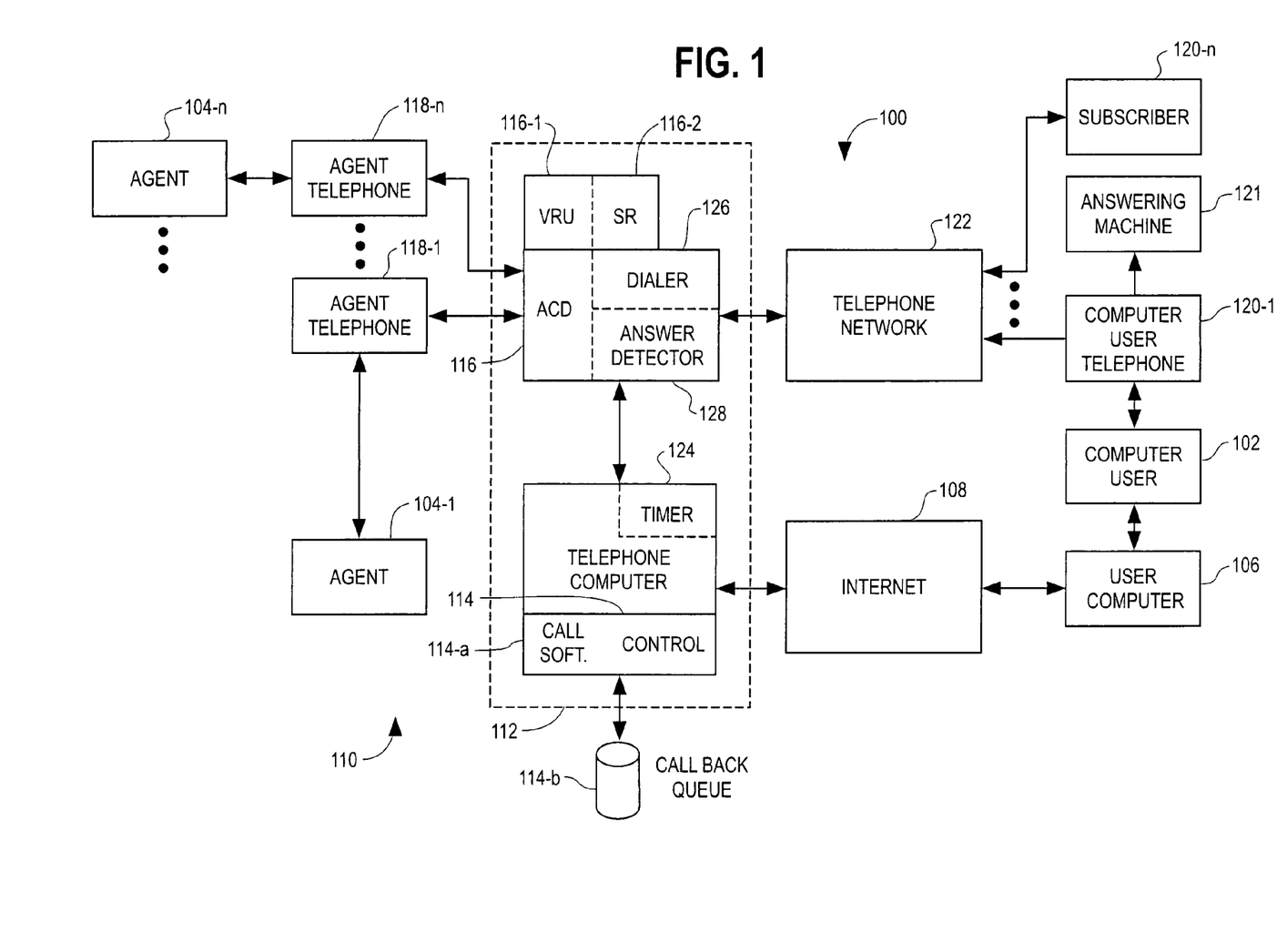
FIG. 1 is a block diagram of an exemplary system in accordance with the invention.

FIG. 1 illustrates a block diagram of an exemplary communications system 100 for establishing voice communications between a computer user 102, via the user's phone 120-1, or subscriber via his/her phone 120-n and an agent 104.

It will be understood that the invention has applicability to a broad range of call distributor systems irrespective of their specific structures. The computer user 102 uses a computer 106, for example, the user's PC, to communicate with other computers through a computer network, such as, for example, the Internet 108, in a well-known manner. Although the system 100 will be described with reference to the Internet, it should be understood that the invention may also be employed with any of a number of computer networks, such as conventional bulletin boards. It can also be used with subscribers who call in via telephone 120-n and want a callback.

Businesses usually have an automated system, generally referenced by numeral 110, for handling inbound and outbound telephone calls. For example, a business may be connected to the Internet 108 via telephone switching system 112. The telephone switching system 112 comprises a telephone, or control, computer 114 connected to an automatic call distributor (ACD) 116. The ACD 116 operates in a well known manner to connect one of a plurality of agent telephones 118-1 associated with respective agents, 104-1 to external telephonic units, such as a computer user telephone 120-1 associated with the computer user 102 or any other phone such as phone 120-n that a subscriber might use. The ACD 116 is connected to the user telephone 120-1 through a telephone network 122. A conventional answering machine 121 can be connected to the user telephone 120-1, or 120-n to record incoming messages. Additionally, any number of subscribers can be coupled, via network 122 to system 110 using telephones, such as 120-2, 120-n.

The computer user 102 can use the user computer 106 to review a multitude of products and services advertised on the Internet 108. Businesses on the Internet 108 advertise on the World Wide Web using home pages. As is well known, home pages may include pictures of a product, descriptions of the product and a listing of a telephone number to call to ask questions or to order the product.

Figure 2:
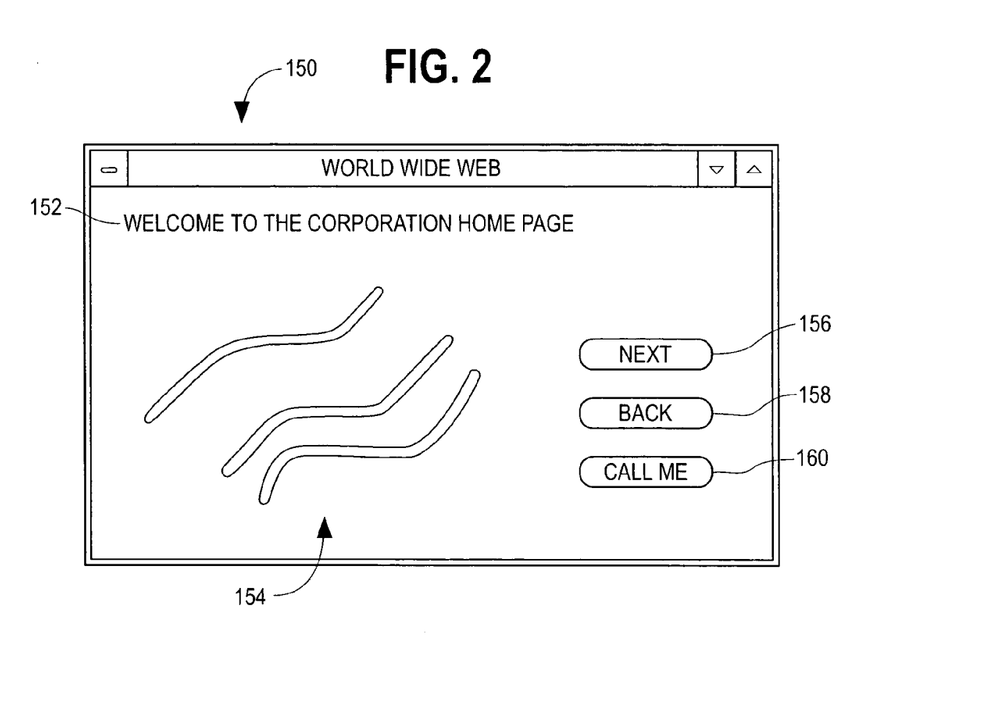
FIG. 2 is an exemplary home page used for advertising, for example, by a business on the Internet.

An exemplary home page 150 which may be used to advertise a product is illustrated in FIG. 2. As is well known, the home pages 150 on the World Wide Web use hypertext technology to enable computer users 102 to move from one computer data base to another at the click of a mouse. The home page 150 includes a text portion 152 and information 154 describing the product or service. When activated, "next" and "back" buttons 156, 158 transfer the computer user 102 to the next home page or to the previous home page, respectively. Additionally, the above information may be entered as conventional text commands.

If the computer user 102 wants to establish voice communications with the business to order a product or to ask a question, the computer user 102 activates a "call me" button 160. In response, the computer user 102 is transferred, to a return call screen 300 shown in FIG. 3. The computer user 102 then enters a name 302, a telephone number to call 304 and a time to call 306 in their respective fields. Alternatively, the computer user's name and telephone number may be kept on file and be automatically entered in the appropriate fields in a well known manner.

Figure 3:
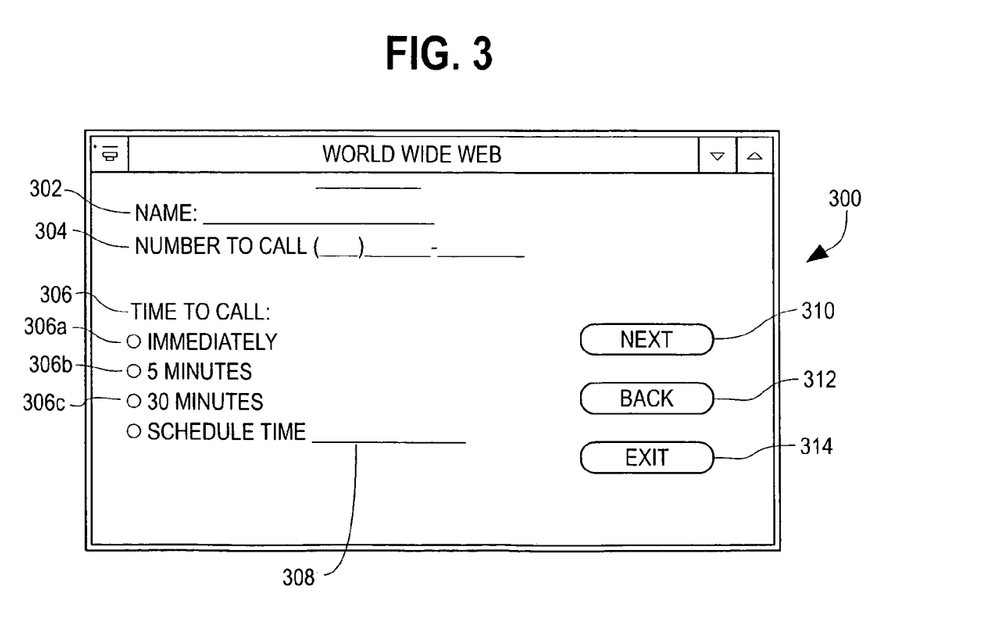
FIG. 3 is an exemplary call screen which can be used to request a return call from the business.

For ease of operation, a list of frequently requested times in which to call may be listed, such as immediately 306a, 5 minutes 306b or 30 minutes 306c. In this case, the computer user 102 would simply click on the desired time. If needed, another time can be entered by the computer user 102 in a designated area 308. It will be understood that both day (or date) and time information could be entered in area 308.

After filling in the requested information, the computer user 102 activates a "next" button 310 to send a call request to the telephone switching system 112. "Back" and "exit" buttons 312, 314 are activated to exit the home page 300 without sending the call request.

Additional information may be included in the call request for processing by the telephone switching network 112. For example, the number of the home page 150 which prompted the call request may be included in the call request. This information is used by the telephone switching system 112 to route the call to an agent having the appropriate knowledge about the product or service which prompted the call. Additionally, the agent 104 can be viewing the home page 150 on a conventional computer display, or other displays, when conversing with the computer user 102 over the agent telephone 118. Numerous displays are well known in the art and may be advantageously employed in the invention.

Preferably, the name 302, telephone number 304 and the time to call 306 information are packetized in to a single conventional electronic mail (E-mail) message (designated a "call request") which is sent over the Internet 108 to computer 114. Alternatively, program to program communications, such as Transmission Control Protocol/Internet Protocol (TCP/IP) sockets which are well known in those skilled in the art, may be used as a means to send the information from the user's computer 106 to the telephone switching system 112.

A telephone computer 114 of the telephone switching system 112 receives the call request, detects the time to call 306 and converts the call request into a predictive dial request command, which is formatted for proper receipt by the ACD 116 under the control of software 114a. The telephone computer 114 may detect the time to call 306 in the call request and delay transmitting the call request to the ACD 116 until the time to call. The request can be stored in callback queue 114b. The telephone computer 114 comprises timer 124, for detecting the time to call 306 in the call request. The timer 124 may be implemented by software. The ACD 116 would then attempt to dial the telephone number 304 substantially immediately upon receipt of the dial request command.

Call back requests initiated via subscriber 120-n can be processed in a similar fashion. Call back times and/or days can be communicated from the requesting subscriber using DTMF tones. Alternately, ACD 116 could be equipped not only with a voice response unit 116-1 for communicating with the subscriber but also a speech recognized 116-2 to receive verbal information from the subscriber.

Alternatively, the telephone computer 114 may transmit the dial request command, which includes the time to call 306 information, substantially immediately upon receipt of the call request. The ACD 116 would then maintain the callback queue 114b, and detect the time to call 306 and delay the outbound dialing of the telephone number 304 until that time. Either the ACD 116 or the telephone computer 114 may therefore control when the telephone number 304 is dialed based on the time to call 306.

Preferably, the ACD 116 uses predictive outbound dialing to call the computer user telephone 120. Systems for providing predictive outbound dialing from the ACD 116 are well known in the art. One such system is described in commonly assigned U.S. Pat. No. 4,881,261, the disclosure of which is hereby incorporated by reference.

The telephone computer 114 sends the dial request command to the ACD 116 for call processing. A dialer 126 in the ACD 116, which is preferably software based, then places an outbound telephone call to the computer user's telephone 120 in a well known manner. An answer detector 128 in the ACD 116 detects when the computer user 102 answers the call, as distinguished from an automated answering machine, a busy signal or no answer. One such means for detecting whether a human answers a telephone call is disclosed in commonly assigned U.S. Pat. No. 4,809,272, the disclosure of which is hereby incorporated by reference.

When the user 102 answers the telephone, the ACD 116 connects the computer user's telephone 120-1 to an appropriate available agent 104-i through agent telephone 118-i. Various methods are well known in the art for selecting an agent to connect to the telephone call. Since the philosophy of such methods is not important to the present invention beyond connecting the telephone call to the agent 104-i, details will not be further given herein. Those desiring additional information regarding methods and systems for selecting agents are referred to U.S. Pat. No. 5,206,903 which is incorporated herein by reference.

Alternatively, the telephone computer 114 may dial the computer user's telephone 120-1 directly and connect the agent telephone 118-i to the computer user's telephone 120-1 when the computer user 102 answers the call. As is well known in the art, commercial telephone cards are available for personal computers for dialing external telephones. After the computer user 102 answers the call, the telephone computer 114 then dials a telephone number, or extension, to access the agent telephone 118-i and thereafter connects the agent 104-i to the computer user 102.

In addition, the ACD 116 may transmit information to the agent 104-i prior to, or simultaneous with, connecting the agent 104-i to the computer user 102. This information may include the computer user's name or other information. The information may be displayed on the display of the agent 104-i or provided to the agent 104-i in any other appropriate manner. Those skilled in the art will likely be able to readily design numerous telephone switching systems using commercially available components for receiving the call request and automatically dialing the computer user's telephone 120-1. Any telephone switching system which can establish voice communications between the computer user 102 and the agent 104-i can be advantageously employed in the present invention.

Alternatively, subscribers 120-n can call in from their respective telephones and where an agent is not available leave a callback request along with a preferred day and time. This request can be stored in callback queue 114b for subsequent retrieval and implementation. Such interactions can be facilitated by voice response unit 116-1. Unit 116-1 can, as known, advise the subscriber or caller as to the delay till an agent will be available and offer options such as waiting or leaving callback information which will in turn be stored in a callback queue such as 114b.

Call control software 114a and call back queue 114b interact with available agents either directly, or, via ACD 116 to minimize callback faults. Such faults, which arise due to inadequate resources, such as agents, at the designated day and time can harm customer/subscriber relations and/or result in lost sales.

Those of skill in the art will recognize that the methodology implemented by call control software 114a could be implemented in whole or in part in computer 114 and/or ACD 116. Exact implementation details are not a limitation of the present invention.

Figure 4:
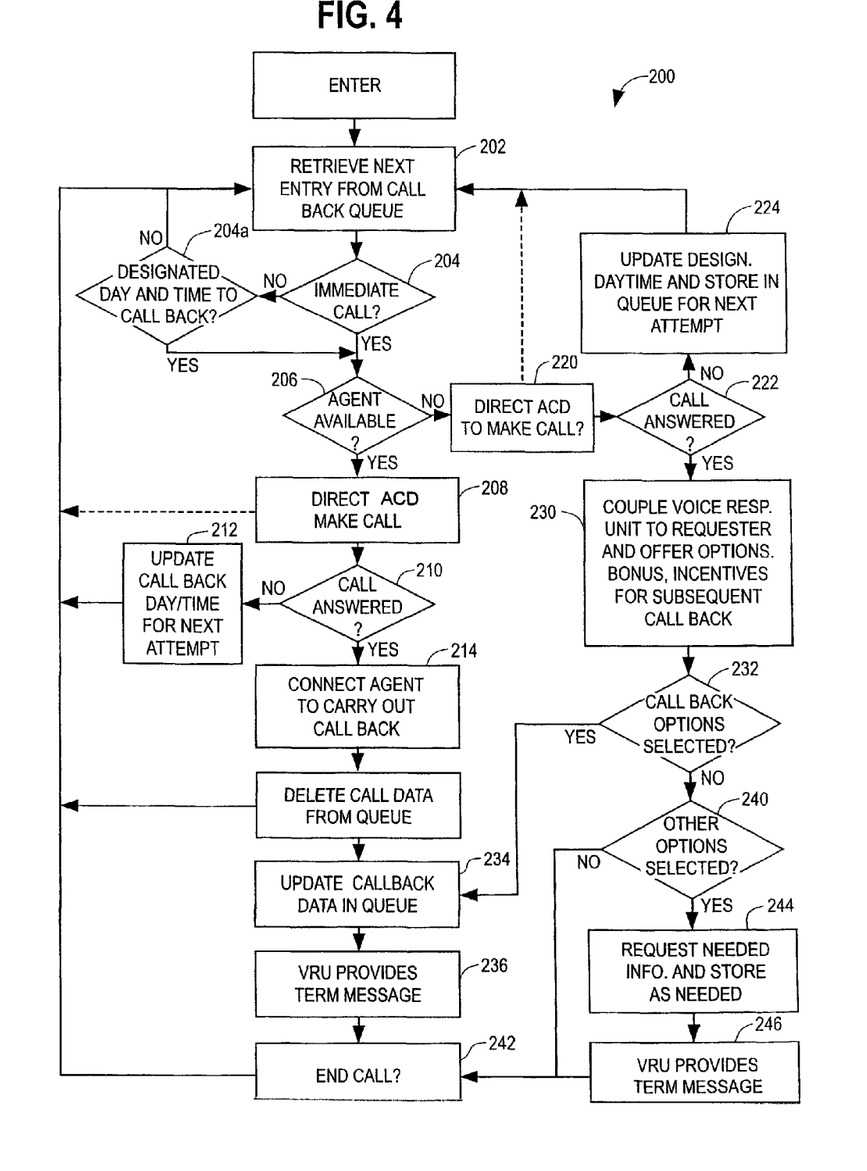
FIG. 4 illustrates an exemplary flow diagram of callback processing.

FIG. 4 illustrates exemplary fault minimizing processing methodology 200 in accordance with the present invention. Methodology 200 minimizes faults in the queue callback system described above relative to system 100 and provides a way of addressing such conditions with the scheduled caller.

In a step 202 the next entry is received from the callback queue, such as queue 114b. If the next entry calls for an immediate callback, step 204, control computer 114 in accommodation with call distributor 116 ascertain the availability of an agent to take the callback step 206.

Where an agent is available the call distributor 116 places the callback to the subscriber, or the user, step 208. Those skilled in the art will understand that the dashed lines illustrated in FIG. 4 are indicative of computer 114 and call distributor 116 carrying out multiple tasks and handling multiple calls substantially simultaneously.

A determination is made, step 210, if the call has been answered. If not, step 212 callback data can be updated on some systematic bases and loaded back into the callback queue 114b for subsequent retrieval. Where the call has been answered the agent is then connected via the call distributor 116 to the subscriber through network 122 step 214.

In the event that an agent is not available for the callback, step 206, the control computer 114 can still direct the call distributor 116 to place the required call step 220. A determination is made as to whether the call has been answered step 222.

If the call has not be answered, the callback day and time information can be updated for a subsequent attempt to try to communicate with the subscriber, or the user, step 224.

Where the user or subscriber has answered the call from the call distributor 116 the voice response unit 116-1 can be coupled to the subscriber to offer a callback message, step 230. The message can include an explanation or an apology for the unavailability of an agent at the designated callback day and time as well as an offer of options to the user or subscriber to elect a subsequent callback day and time or non-callback options. The message could also offer bonus or incentive information to the subscriber.

Those of skill in the art will understand that the subscriber or the user can respond to the voice response unit using telephone key pad. Alternatively, if call distributor 116 incorporates speech recognition unit 116-2, it would enable a subscriber or a user to select or specify callback or non-callback options verbally.

Where callback options are selected, step 232, the computer 114 can update the callback data in queue 114b, step 234. The voice response unit can provide one or more intermediate or termination messages, step 236.

Where the user or subscriber has not selected any callback options, other options can be presented for selection, step 240. If no other options are selected, the call can be terminated or ended, step 242. Alternately, step 244, the voice response unit 116-1 can request additionally information from the subscriber or user via the telephone keypad or the speech recognition unit 116-2. A termination message can then be provided, step 246. Subsequently, the call can be terminated, step 242.

Where the next entry is not for an immediate callback, it is not made until the appropriate day and time, step 204a.

Those of skill in the art will understand that there are variations of the above method 200. All such variations come within the spirit and scope of the present invention. More particularly, in step 206 a plurality of agent queues can be assessed to make a determination as to whether or not an agent is available to participate in the callback to the user or subscriber at the specified time. The sizing and establishment of multiple agent queues would be known to those skilled in the art and no further discussion thereof is necessary.

It will be understood that, methods of calculating statistics associated with call center operation are well known to those skilled in the art. Software files such as ErlangXL97.xla, named "Erlang for Excel" from West Bay Engineers Limited, West Sussex, United Kingdom (www.erlang.com/excel.html) are available for download over the Internet and enables a user to calculate various call center statistics such as Average Speed of Answer in the Excel spreadsheet program offered by Microsoft Corporation. Some other call center statistics that can be calculated include:

Abandoned—the percentage of callers who will abandon after a given time.

AgentsAvailable—Number of telephony system Agents available to make calls

Agents Calc—calculate the number of agents required to achieve a SLA target.

AgentsASA—calculate the number of agents required to achieve an ASA target.

Average Speed to Answer (ASA)—the average time taken to connect to an agent.

Calls—Per hour value from telephony system

Call Capacity—the maximum number of calls that can be handled by system.

Fractional Agents—calculate the number of agents required to achieve a SLA target.

Fractional Call Capacity—the maximum number of calls that can be handled.

Queue Size—average number of calls queuing.

Queue Time—the average waiting time for those calls that are not answered immediately.

Queued—the percentage of calls that will be queued.

Trunks—the number of telephone trunks required for a given call load.

Service Time—the time within which a certain percentage of calls will be answered.

SLA—the actual percentage of calls answered with the target time.

Usage—percentage of agent's time spent on the telephone.

Alternately, other methods of generating call center statistics based on call center performance such as the number of available agents available and the amount of transaction traffic or queue size information may be obtained from using the Traffic V3 product or the products known as the Erlang-G or Call Center plug in from Erlang Software, Erlang Software, BICTON, Australia (www.erlang-software.com). Additionally, publicly available documentation on the Internet such as those offered through the Center for Call Center Studies in conjunction with Purdue University, West Layfette, Ind., USA (www.ccdq.com) display information on how to derive call center statistics based on performance information. These statistics determining processes can be used in connection with implementing alternate systems and methods of FIGS. 5-7 discussed subsequently.

Figure 5:
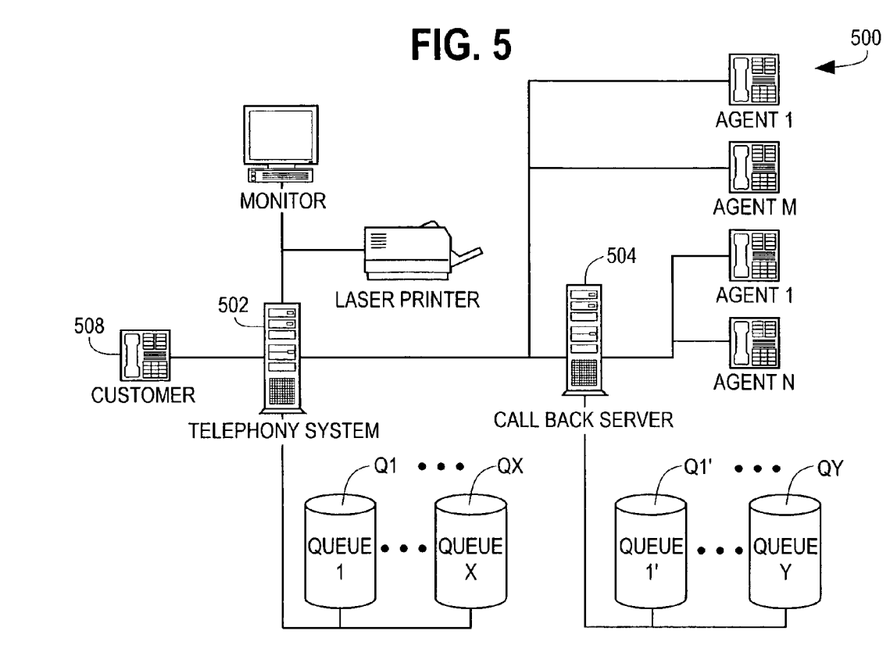
FIG. 5 is a block diagram of an alternate system in accordance with the invention.

FIG. 5 illustrates an alternate system 500 in accordance with the invention. The system 500 incorporates a telephony system generally indicated at 502 of a type previously discussed and comparable to system 112. The telephony system 502 maintains a plurality of agent queues, Q1, Q2 . . . QX which would be sized and have associated parameters as would be understood by those of skill in the art. Agents 1 . . . m are associated with system 502 and queues Q1 . . . QX.

System 500 also incorporates a callback server 504 which is in communication with the telephony system 502. Callback server 504 maintains agent queues Q1' . . . QY. Agents 1 . . . N are associated with callback server 504.

A customer using a telephone 508 can communicate with the system 502 in known fashion. In a situation where an appropriate agent is not readily available for the call coming in from telephone 508, the customer can request a callback at a specific day and time, or, an immediate callback from telephony system 502.

Figure 6:
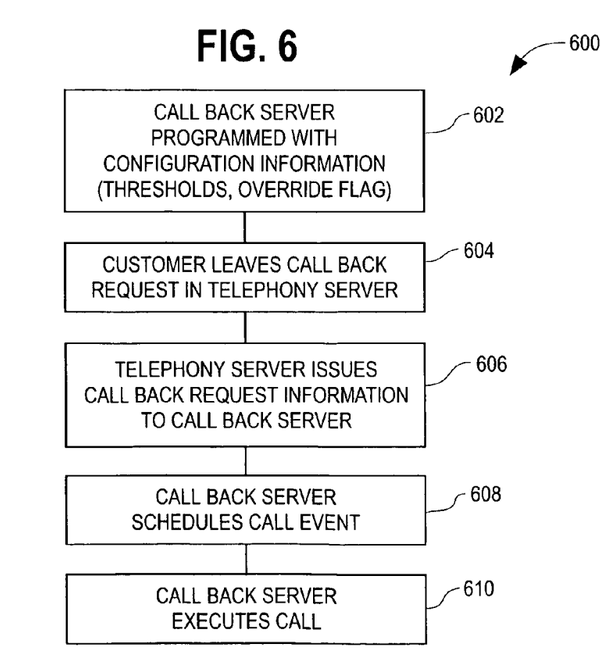
FIG. 6 is an overall flow diagram of another method in accordance with the invention.

FIG. 6 is a flow diagram of a method 600 for providing callbacks while at the same time minimizing queue callback faults. In a step 602 callback server, such as a server 504, is programmed with the appropriate configuration information for evaluating multiple agent queues so as to minimize callback faults. In a step 604, the customer or subscriber leaves the callback requests, perhaps by a telephone 508, at the telephony server 502.

In a step 606 the telephony server issues callback request information to callback server 504. In a step 608, the callback server 504 schedules the callback. Finally, in a step 610, the callback server 504 executes the call at the appropriate day and time.

Figure 7:
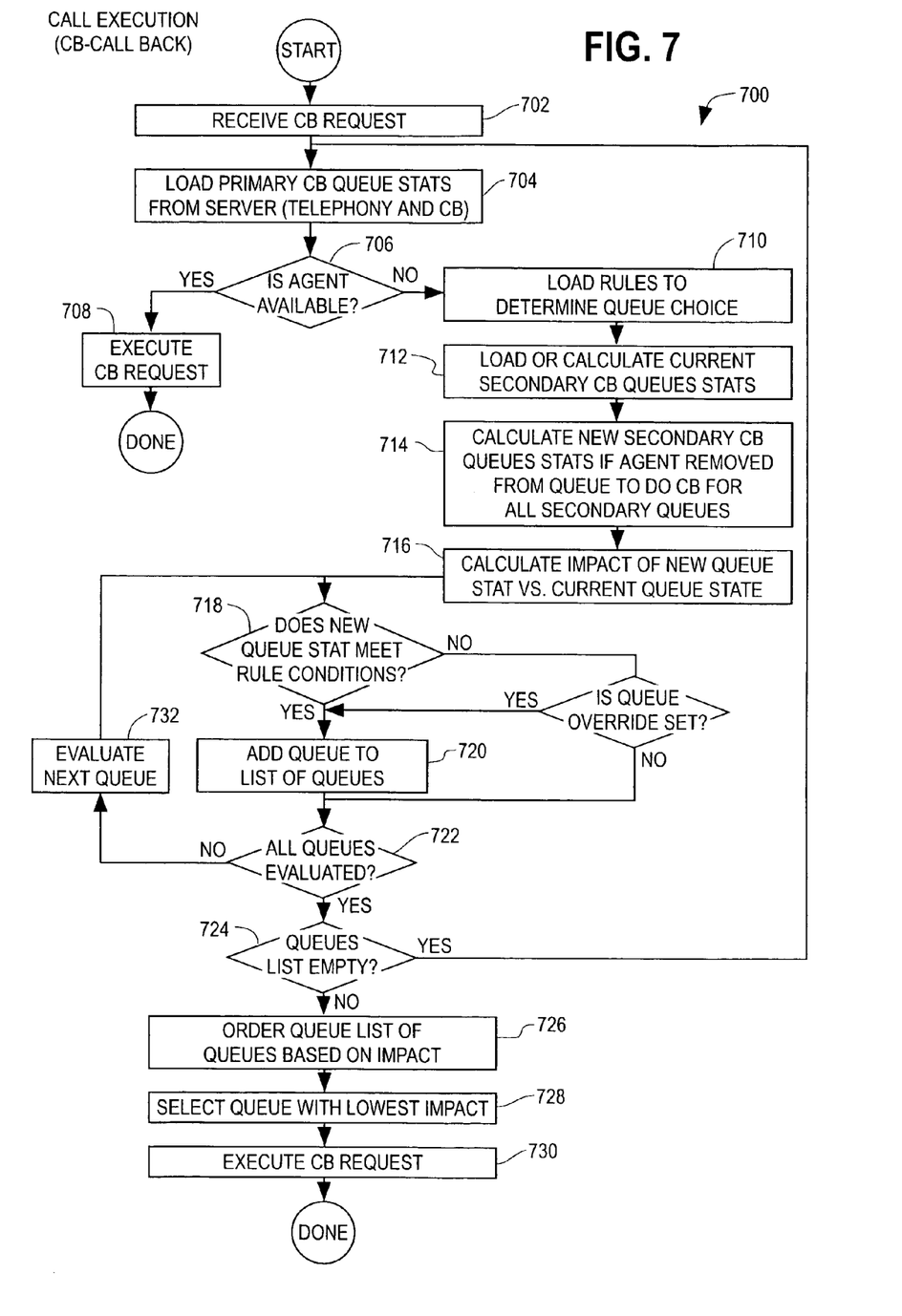
FIG. 7 is a more detailed flow diagram of the method of FIG. 6.

FIG. 7 is a flow diagram of a method 700 illustrating additional details of the method 600. In a step 702, a callback request is received perhaps from the subscriber by a telephone 508. Primary callback queue status, and, statistical information is loaded or obtained from both the telephony system 502 and the callback server 504, step 704. Availability of an agent is ascertained, step 706. If an agent is available the callback is executed in a known fashion via the available agent, step 708.

In the absence of an agent, rather than failing to make the callback, a predetermined set of rules is loaded to determine which queue is to be selected for an agent to make the call back(s), step 710. In step 712 the status and statistics of the current and secondary callback queues Q1' . . . QY is determined. In step 714, a new set of callback queue statistics is determined if an agent is removed from a selected queue to carry out callbacks for all of the secondary queues.

In a step 716, evaluations are made of the impact of the new queue statistics versus current queue statistics. In step 718 an evaluation is made to determine if the new queue statistics meet requirements or conditions of the rules. If so, the queue is added to a list of queues of step 720. If all queues have been evaluated, step 722, and the queue list is empty, step 724, the queues and the list can be ordered based on impact of removing an agent from the queue to do the callbacks, step 726.

In a step 728, the queue is selected to provide an agent for callbacks which has the least impact on operations. In a step 730 the callback request is executed by the selected agent. The process continues until all queues have been evaluated, step 732.

It will be understood that the process 700 of FIG. 7 can be implemented using a variety of agent queue configurations, all without limitation. The particular agent queue configurations selected for a specific installation are not a limitation of the present invention. It will also be understood that methodology in accordance with the system 700 could be incorporated to provide an agent for callbacks in accordance with method 200 of FIG. 4.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A callback process comprising:
    receiving a plurality of callback requests from callback requesters and scheduling at least some of the requesters for respective scheduled callbacks at respective subsequent scheduled times selected by the callback requesters;
    providing at least some callbacks to some of the scheduled callback requesters using a human agent;
    initiating at the respective scheduled times at least some callbacks using a non-human communication to other scheduled callback requesters in response to determining that a human agent is not available at the scheduled time for the scheduled callbacks to the other scheduled callback requesters, the non-human communication offering the other scheduled callback requesters at least an opportunity to establish a subsequent rescheduled callback; and
    storing received data for the rescheduled callback.

2. A process as in claim 1 which includes placing at least one of the callbacks in accordance with determined respective callback data via one of a human agent available to conduct the call, or a predetermined message soliciting the establishment of the subsequent rescheduled callback.

3. A process as in claim 1 which includes storing callback data for subsequent follow-up in the event that the rescheduled callback is not established.

4. A process as in claim 1 where the received data includes callback day and time information and wherein the schedule callbacks are placed in a callback queue for retrieval at the schedule time.

5. A process as in claim 1 which includes providing a plurality of human agent queue's, at least some of which are evaluated in determining if an agent is available to take the callback.

6. A process as in claim 1 where a non-human agent is placed into communication with a respective callback requester to offer the opportunity of scheduling the rescheduled callback.

7. A process as in claim 6, including verbally responding to the respective callback requester and offering at least one of an explanation and apology for unavailability of the human agent.

8. A process as in claim 7 including recognizing requester feedback.

9. A process as in claim 8 including verbally providing at least one of bonuses and incentives to induce the requester to schedule the rescheduled callback.

10. A system comprising:
    an automatic call distribution system; and
    control software coupled to the distribution system to communicate via a non-human agent callback with a party that has previously requested and scheduled a callback at a scheduled time selected by the party, in response to determining an absence of availability at the scheduled time of a human agent for the scheduled callback the non-human agent callback offering the party at least an opportunity to establish a subsequent rescheduled callback.

11. A system as in claim 10 which includes at least one callback queue.

12. A system as in claim 11 where the software receives callback information from the queue.

13. A system as in claim 12 which includes a control computer coupled to the call distributor.

14. A system as in claim 13 where the control computer executes the control software and has access to the callback queue.

15. A system as in claim 11 which includes communications equipment, for a plurality of agents, coupled to the call distributor.

16. A system as in claim 15 which includes a voice response unit, coupled to the call distributor, for presenting an audible message to at least one party.

17. A system as in claim 16 where the voice response unit presents a plurality of options, verbally, to at least one party.

18. A system as in claim 11 where the software evaluates callback requests in the queue and responds to callback time information therein.

19. A system as in claim 18 where the software also responds to callback related date information.

20. A system as in claim 18 which includes a voice response unit, coupled to the call distributor, for presenting an audible message to at least one party including at least one of an explanation and an apology for unavailability of the human agent.

21. A system comprising:
    call distribution software for coupling available human agents to parties who have previously made respective callback requests; and
    control software coupled to the distribution software to communicate via a non-human agent callback with a party that has previously requested and scheduled a callback at a scheduled time selected by the party, the non-human callback initiated in response to determining an absence of availability at the scheduled time of a human agent for the scheduled callback the non-human agent callback offering the party at least an opportunity to establish a subsequent rescheduled callback.

22. A system as in claim 21 which includes software for maintenance of a callback queue.

23. A system as in claim 21 where the call distribution software includes additional software for placing a call to a respective party who has requested a callback.

24. A system as in claim 21 which includes software to determine that no human agent is available for the callback.

25. A system as in claim 24 which includes audible message generating software which facilitates communication with the party which has requested the callback including generating a message offering at least one of an apology and an explanation for unavailability for the human agent.

* * * * *